United States Patent
Long et al.

(10) Patent No.: US 11,970,973 B2
(45) Date of Patent: Apr. 30, 2024

(54) ELECTRIC MACHINE COOLING OF STATOR WITH TUBE

(71) Applicants: Rolls-Royce Corporation, Indianapolis, IN (US); Rolls-Royce North American Technologies, Inc., Indianapolis, IN (US); Rolls-Royce Electrical Norway AS, Trondheim (NO)

(72) Inventors: Stephen Andrew Long, Carmel, IN (US); David Russell Trawick, Indianapolis, IN (US); Sean Morgan, Indianapolis, IN (US); Kolbeinn Kristjansson, Trondheim (NO)

(73) Assignees: Rolls-Royce Corporation, Indianapolis, IN (US); Rolls-Royce Electrical Norway AS, Trondheim (NO); Rolls-Royce North American Technologies, Inc., Indianapolis, IN (US)

( * ) Notice: Subject to any disclaimer, the term of this patent is extended or adjusted under 35 U.S.C. 154(b) by 718 days.

(21) Appl. No.: 16/988,166

(22) Filed: Aug. 7, 2020

(65) Prior Publication Data
US 2022/0042458 A1  Feb. 10, 2022

(51) Int. Cl.
| | | |
|---|---|---|
| H02K 5/20 | (2006.01) |
| F01D 15/10 | (2006.01) |
| F01P 5/10 | (2006.01) |
| F01P 5/12 | (2006.01) |
| F02C 7/12 | (2006.01) |
| F02C 7/32 | (2006.01) |
| F16C 33/10 | (2006.01) |
| F16C 37/00 | (2006.01) |
| H02K 1/20 | (2006.01) |
| H02K 7/18 | (2006.01) |
| H02K 9/10 | (2006.01) |

(Continued)

(52) U.S. Cl.
CPC ............... *F02C 7/12* (2013.01); *F01D 15/10* (2013.01); *F01P 5/10* (2013.01); *F01P 5/12* (2013.01); *F02C 7/32* (2013.01); *F16C 33/1025* (2013.01); *F16C 37/00* (2013.01); *H02K 1/20* (2013.01); *H02K 5/20* (2013.01); *H02K 7/1823* (2013.01); *H02K 9/10* (2013.01); *H02K 9/19* (2013.01); *H02K 9/197* (2013.01); *F05D 2210/11* (2013.01); *F05D 2220/76* (2013.01)

(58) Field of Classification Search
CPC ............ H02K 5/20; H02K 5/203; H02K 1/20
See application file for complete search history.

(56) References Cited

U.S. PATENT DOCUMENTS

| | | | |
|---|---|---|---|
| 7,669,558 B2 | 3/2010 | Claypole et al. |
| 9,260,007 B2 | 2/2016 | Sakaguchi |

(Continued)

FOREIGN PATENT DOCUMENTS

| | | |
|---|---|---|
| DE | 102010047507 A1 | 6/2011 |
| JP | 2002187435 A | 7/2002 |

*Primary Examiner* — Tulsidas C Patel
*Assistant Examiner* — Robert E Mates
(74) *Attorney, Agent, or Firm* — Shumaker & Sieffert, P.A.

(57) ABSTRACT

An example system comprises an electric machine including a stator and a rotor, a cooling system configured to supply a cooling fluid to cool the electric machine, and a stator tube configured to contain the cooling fluid within a stator portion of the electric machine and prevent the cooling fluid from contacting the rotor.

16 Claims, 5 Drawing Sheets

(51) Int. Cl.
*H02K 9/19* (2006.01)
*H02K 9/197* (2006.01)

(56) References Cited

U.S. PATENT DOCUMENTS

| | | | | |
|---|---|---|---|---|
| 2002/0073726 | A1* | 6/2002 | Hasebe | F01P 7/165 |
| | | | | 903/905 |
| 2003/0044097 | A1* | 3/2003 | Trapp | F16C 35/073 |
| | | | | 384/540 |
| 2011/0084561 | A1* | 4/2011 | Swales | H02K 9/19 |
| | | | | 180/65.26 |
| 2014/0139061 | A1* | 5/2014 | Gutjahr | H02K 9/197 |
| | | | | 310/86 |
| 2016/0319745 | A1* | 11/2016 | Zeller | F01D 25/18 |

* cited by examiner

ELECTRIC MACHINE COOLING OF STATOR WITH TUBE

TECHNICAL FIELD

The disclosure relates to electric machine cooling.

BACKGROUND

Cooling may be used to remove heat generated within rotating machinery. Heat may be generated within rotating machinery via resistance of the windings, eddy currents, and hysteresis induced losses. Heat removal from rotating machinery may be critical for rotating machinery whose failure would be highly detrimental to operations.

SUMMARY

This disclosure describes a cooling system and techniques configured to cool an electric machine and an engine. As one example, the cooling system may include a pump configured to move a cooling fluid through a cooling circuit including one or more stator portions of the electric machine. The one or more stator portions may include stator windings. The electric machine may be configured such that the majority of heat generation (e.g., due to energy loss) occurs in the stator, e.g., via stator winding resistance, and relatively little heat generation occurs in a rotor of the electric machine. The electric machine may include a stator tube internally mounted to the stator and configured to contain the cooling fluid within the stator portion(s) and prevent the cooling fluid from contacting the rotor.

The pump may move the cooling fluid through the stator portion(s) to remove heat from the stator windings via conduction. In some examples, the cooling circuit is also configured to supply the cooling fluid to bearings of the electric machine (e.g., rotor bearing(s)) to cool and/or lubricate the bearings. The one or more bearings and the stator portions may be part of the same cooling circuit and the pump may supply the same cooling fluid to the bearing(s) and stator portion(s) to cool the stator windings and to cool and/or lubricate the bearings.

In some examples, a system may further include a prime mover, e.g., an engine. The engine may be coupled to the electric machine. For example, a shaft of the engine may be rotationally coupled to the rotor of the electric machine. In some implementations, the engine may be part of the same cooling circuit as the electric machine, and the pump may supply the same cooling fluid to the engine, the stator portion(s) of the electric machine, and bearings of the electric machine.

In some examples, the use of a common cooling system between a prime mover (e.g., an engine) and an electric machine may reduce overall system weight and complexity by reducing the number of fluid types, fluid loops (including pumps, radiators, tanks, piping, and the like), and the overall amount of cooling fluid. In some examples, a pump, such as a gearbox driven pump, may be mounted on a non-drive end or side of the electric machine, which may reduce the number and/or length and mass of tubes.

In some examples, the disclosure describes a system comprising an electric machine including a stator and a rotor; a cooling system configured to supply a cooling fluid to cool the electric machine; and a stator tube configured to contain the cooling fluid within a stator portion of the electric machine and prevent the cooling fluid from contacting the rotor.

In some examples, the disclosure describes a method of cooling an electric machine, the method comprising: supplying, by a cooling system, a cooling fluid to flood a stator portion of the electric machine with the cooling fluid, wherein the electric machine comprises a stator tube configured to contain the cooling fluid within a stator portion of the electric machine and prevent the cooling fluid from contacting the rotor.

In some examples, the disclosure describes a system comprising an electric machine comprising a rotor, a stator, a stator tube, and one or more bearings; a gas turbine engine comprising a shaft coupled to the rotor of the electric machine; a cooling system comprising: a cooling circuit configured to supply cooling fluid to the gas turbine engine, the stator of the generator, and the one or more bearings of the generator, wherein the stator tube is configured to contain the cooling fluid within a stator portion of the electric machine and prevent the cooling fluid from contacting the rotor.

The details of one or more examples are set forth in the accompanying drawings and the description below. Other features, objects, and advantages will be apparent from the description and drawings, and from the claims.

DETAILED DESCRIPTION

Electric machines convert electrical energy to mechanical energy or vice versa. As one example, an electric machine may operate as a generator that converts mechanical energy into electrical energy. As another example, an electric machine may operate as an electric motor that converts electrical energy into mechanical energy. Electric machines typically include a rotor that rotates within or around a stator. Energy flows through the stator to or from the rotor. In an electric motor, the stator provides a varying magnetic field that drives the rotor. In a generator, the stator converts the rotating magnetic field of the rotor to electric energy.

High energy density electric machines, for example, brushless AC/DC machines such as AC synchronous machines, may be used for the purpose of electrical power generation on aircraft to help meet volume and weight restrictions for aerospace applications. Electric power may be used for propulsion of a vehicle, such as an aircraft, or to supply on-board electrical loads. High power density machines may require an effective means of removing heat that is generated within the stator and rotor. Heat generated within the stator may be due to stator winding resistance, and heat generated within the rotor may be due to eddy current and hysteresis induced losses. In addition, bearing lubrication may be used for healthy bearing operation.

In some examples, the disclosure describes a cooling system and techniques for cooling an electric machine. In some examples, the electric machine may be configured to reduce losses in the rotor such that the majority of heat generation occurs in the stator. The cooling system and techniques further includes a cooling circuit limited to the stationary portion of the generator via a liquid flooded cooling circuit within the stator. The cooling system and techniques may further include a common liquid circuit via integrating the cooling circuit of the electric machine with the cooling circuit of the prime mover, e.g., an engine. In some examples, the use of a common cooling system between a prime mover (e.g., an engine) and an electric machine may reduce overall system weight and complexity by reducing the number of fluid types, fluid loops, and the overall amount of cooling fluid. In some examples, a pump, such as a gearbox driven pump, may be mounted on a non-drive end or side of the electric machine, which may reduce the number and/or length and mass of tubes. In some examples, the electric machine may include vent holes drawing outside air over the rotor as a result of scavenge pumps on the bearing system of the electric machine.

Figure 1:
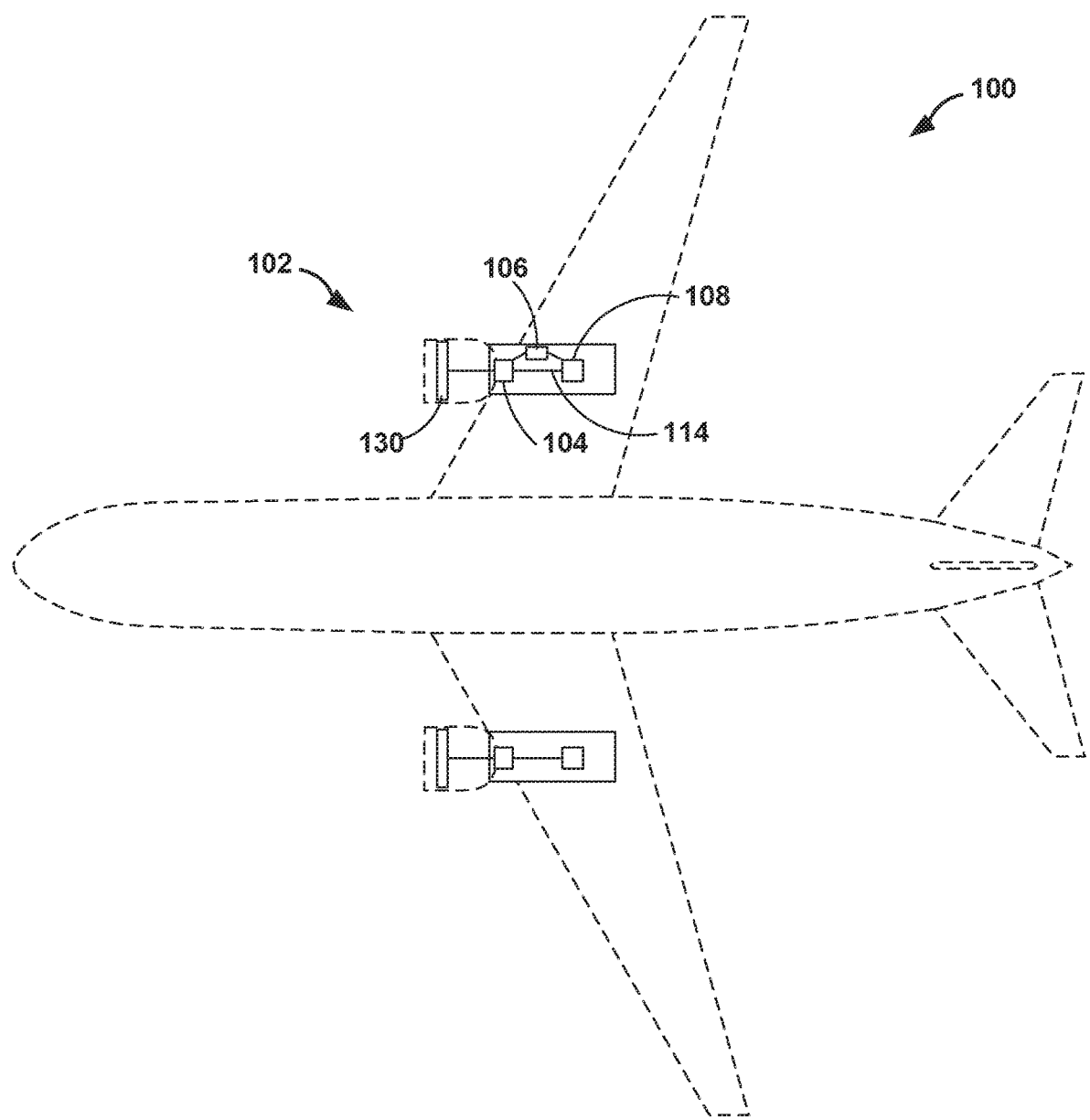
FIG. 1 is a conceptual diagram of a vehicle that includes an electric machine, in accordance with one or more techniques of this disclosure.

FIG. 1 is a conceptual diagram of a vehicle 100 that includes an electric machine, in accordance with one or more techniques of this disclosure. In some examples, vehicle 100 includes an aircraft. In other examples, vehicle 100 may include any type of vehicle utilizing an electric machine, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 100 may be manned, semiautonomous, or autonomous.

As shown in the example of FIG. 1, vehicle 100 includes a propulsion system 102. In some examples, propulsion system 102 may include a combustion engine, such as a gas turbine engine 104. In the example shown, gas turbine engine 104 is configured to drive a propulsor 130. Some propulsion systems that include gas turbine engines may include an electric machine 108. In some examples, electric machine 108 may be an electric starter/generator (ESG) that may both start gas turbine engine 104 and generate electrical power using mechanical energy generated by gas turbine engine 104. In the example shown, electric machine 108 is coupled to gas turbine engine 104 via shaft 114. In some examples, electric machine 108 may be electrically connected to an electric machine such as an electric motor (not shown) that is configured to drive propulsor 130, e.g., rather than gas turbine engine 104 being mechanically coupled to and driving propulsor 130. For example, an electric motor may drive propulsor 130, and electric machine 108 and a gas turbine engine may be located and/or mounted anywhere on the aircraft, e.g., the fuselage. In some examples, any of electric machine 108, an electric motor, and a gas turbine engine may be mechanically coupled to propulsor 130, e.g., either one or both of an electric motor and a gas turbine engine may drive propulsor 130.

In accordance with one or more techniques of this disclosure, vehicle 100 may include components configured to cool and/or remove heat from electric machine 108. For instance, vehicle 100 may include a cooling system 106 in fluid communication with electric machine 108 and/or components of electric machine 108. In some examples, a single fluid system and fluid type may be used for both a heat engine, e.g., gas turbine engine 104 and electric machine 108.

In some examples, cooling system 106 may be configured to cool both electric machine 108 and gas turbine engine 104. Cooling system 106 may include a pump configured to move a cooling fluid through a cooling circuit including one or more stator portions of ESG 108. The one or more stator portions may include stator windings. Electric machine 108 may be configured such that the majority of heat generation (e.g., due to energy loss) occurs in the stator, e.g., via stator winding resistance, and relatively little heat generation occurs in a rotor of electric machine 108. Electric machine 108 may include a stator tube internally mounted to the stator. The stator tube may be configured to contain the cooling fluid within the stator portion(s) and prevent the cooling fluid from contacting the rotor.

The pump may move the cooling fluid through the stator portion(s) to remove heat from the stator windings via conduction. In some examples, cooling system 106 is also configured to supply the cooling fluid to bearings of the electric machine (e.g., rotor bearing(s)) to cool and/or lubricate the bearings. The one or more bearings and the stator portions may be part of the same cooling circuit and the pump may supply the same cooling fluid to the bearing(s) and stator portion(s) to cool the stator windings and to cool and/or lubricate the bearings.

In some examples, gas turbine engine 104 may be fluidically connected to cooling system 106 and be part of the same cooling circuit as electric machine 108, and the pump may supply the same cooling fluid to gas turbine engine 104 and the stator portion(s) and bearings of electric machine 108.

Figure 2:
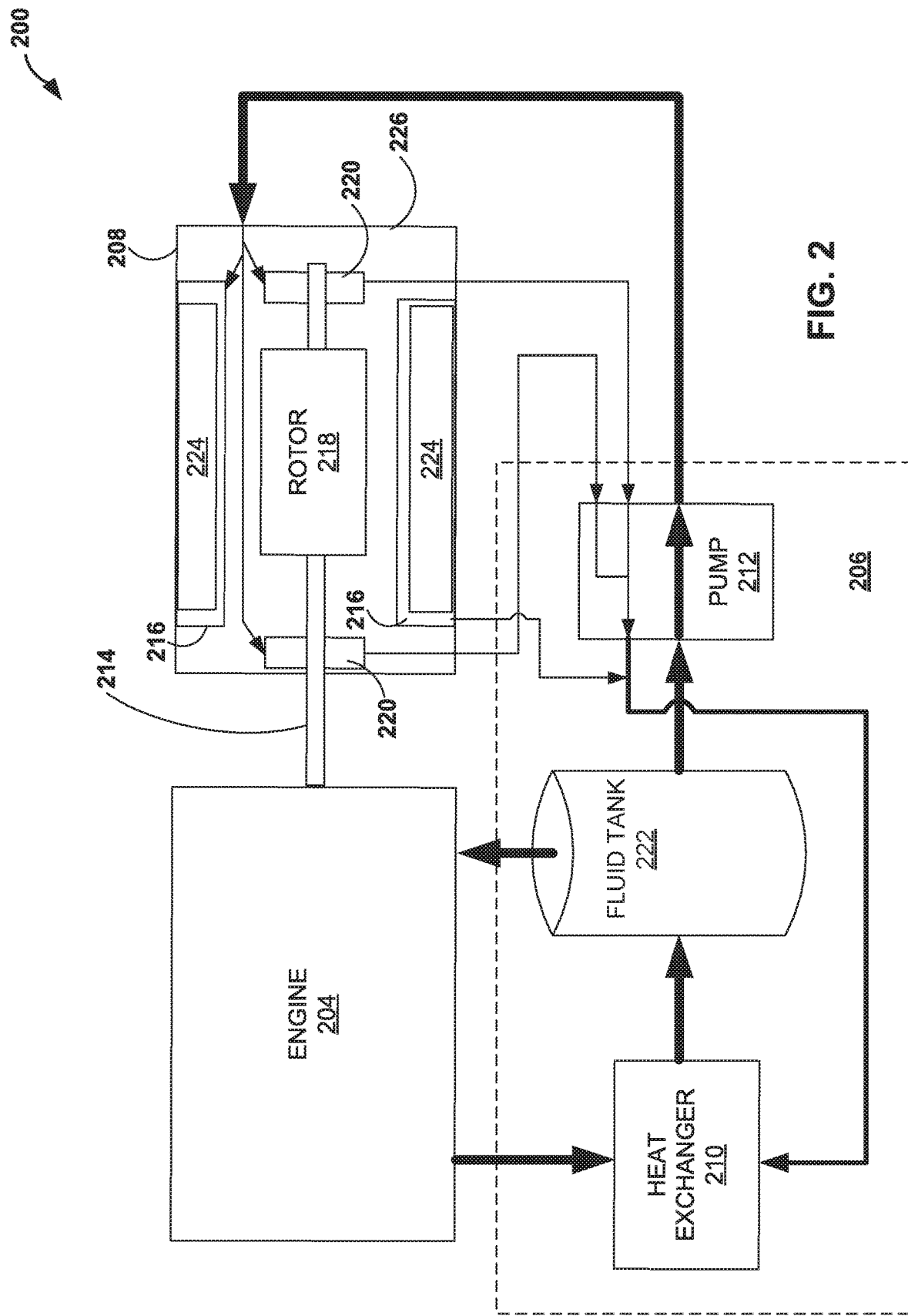
FIG. 2 is a conceptual diagram illustrating an example cooling circuit, in accordance with one or more techniques of this disclosure.

FIG. 2 is a conceptual diagram illustrating an example cooling circuit 200, in accordance with one or more techniques of this disclosure. In the example shown, cooling circuit 200 includes an engine 204, a cooling system 206, and an electric machine 208. In the example shown, cooling system 206 includes a fluid tank 222, a pump 212, and a heat exchanger 210. Cooling system 206 may be fluidically coupled to electric machine 208, and optionally fluidically coupled to engine 204.

Fluid tank 222 includes any suitable fluid container and may be made of metal, plastic, a composite, or any other acceptable material. Fluid tank 222 may receive and store cooling fluid, and generator cooling system 206 may draw cooling fluid from fluid tank 222. For example, pump 212 may be configured to move cooling fluid from fluid tank 222 to other components of cooling circuit 200, including ESG 208 and heat exchanger 210. Pump 212 may be any appropriate pump, for example, a gear pump, a piston pump, a vane pump, and the like. In some examples, cooling system 206 may include a plurality of fluid tanks 222, a plurality of pumps 212, and cooling circuit 200 may include a plurality of electric machines 208.

Heat exchanger 210 may be configured to transfer heat from the cooling fluid to a heat sink, for example, via liquid cooling, air cooling and/or vapor cooling. In some examples, heat exchanger 210 may be parallel-flow, counter-flow, finned tubular, unfinned tubular, u-tube, single pass straight, double pass straight, plate-and-frame, pate-fin, microchannel, or any appropriate type of heat exchanger for dissipating heat from a fluid. In some examples, generator cooling system 206 may include a plurality of heat exchangers 210.

Electric machine 208 may include a rotor 218 connected to a shaft 214, a stator 224 including windings comprised of electrical conductors, and one or more bearings 220 configured to support shaft 214 and allow rotational motion of shaft 214. In the example shown, electric machine 208 includes stator tube 216 configured to contain fluid and keep the rotor 218 environment dry and/or or free of fluid such as a cooling fluid.

In some examples, electric machine 208 may be configured to minimize losses in the rotor such that the majority of heat generation of electric machine 208 occurs in stator 224. For example, rotor 212 may be configured to minimize hysteresis induced losses and eddy currents induced in the magnetic core, and the majority of heat generated within electric machine 208 may occur in stator 224 due to stator winding resistance. In some examples, electric machine 208 may be a generator, such as ESG 108.

Electric machine 208 may be mechanically connected to engine 204 via shaft 214. In some examples, engine 204 may be a combustion engine such as an internal combustion engine, a heat engine, a gas turbine engine, and the like.

In some examples, cooling circuit 200 may include any appropriate fluid for cooling, for example, water, oil, a refrigerant, a vapor, or any fluid with acceptable thermal and/or lubrication properties. In some examples, cooling circuit 200 may be configured to be limited within electric machine 208 to the stationary part of electric machine 208, e.g., stator 224. In some examples, cooling circuit 200 may be configured to also provide fluid for cooling and lubrication of bearings 220.

In the examples shown, pump 212 may draw fluid from fluid tank 222 which may be received by engine 204 and electric machine 203. Engine 204 may be cooled by transferring at least a portion of its generated heat to the cooling fluid, which may then be received by heat exchanger 210. Heat exchanger 210 may cool the cooling fluid via transferring heat from the cooling fluid, for example, by air cooling or otherwise removing heat from the cooling fluid. The cooling fluid may then be received by fluid tank 222.

Cooling fluid received by electric machine 208 may be distributed to the stator tube 216 and bearings 220. Stator windings may be within stator tube 216 and may be flooded by the cooling fluid and may transfer at least a portion of its heat via conduction to the cooling fluid. In some examples, rotor 218 may also transfer at least a portion of its heat across an airgap to the cooling fluid via convection and radiation, and through bearings 220. Bearings 220 may be—lubricated by the cooling fluid and may transfer at least a portion of their heat via conduction to the cooling fluid, and the cooling fluid may provide lubrication for bearings 220.

The cooling fluid may exit electric machine 208 and be received by heat exchanger 210, which may cool the cooling fluid via heat transfer from the cooling fluid as described above. The cooling fluid may then be received by fluid tank 222.

In some examples, the use of a common cooling system between a prime mover (e.g., an engine) and an electric machine may reduce overall system weight and complexity by reducing the number of fluid types, fluid loops (including pumps, radiators, tanks, piping, and the like), and the overall amount of cooling fluid. In some examples, a pump, such as a gearbox driven pump, may be mounted on a non-drive end 226 or a side of the electric machine, which may reduce the number and/or length and mass of tubes.

Figure 3:
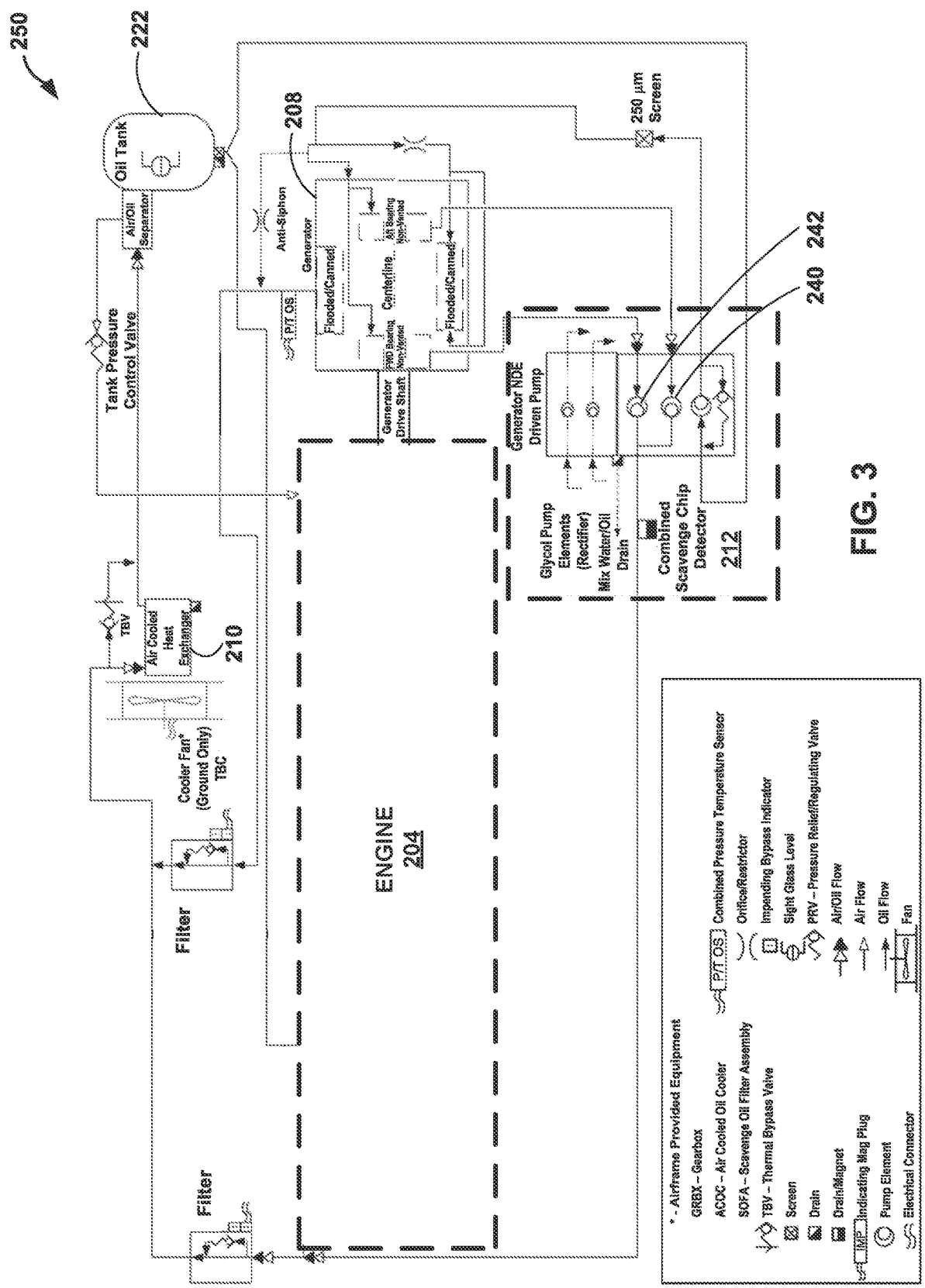
FIG. 3 is a conceptual diagram illustrating another example cooling circuit, in accordance with one or more techniques of this disclosure.

FIG. 3 is a conceptual diagram illustrating another example cooling circuit, in accordance with one or more techniques of this disclosure. In the example shown, cooling circuit 250 includes an engine 204, a pump 212, a fluid tank 222, a heat exchanger 210, and an electric machine 208. Cooling circuit 250 may be substantially similar to cooling circuit 200, and may illustrate additional details of components and air, cooling fluid (e.g., cooling oil), mechanical, and electrical connections between cooling system 206, electric machine 208, and engine 204. For example, pump 212 may be mounted on the non-drive end of electric machine 208, which may save weight in tubes and provide a clean layout for system integration. In some examples, electric machine 208 rotor cooling may be improved by adding vent holes which draw in outside air over the rotor as a result of scavenge pumps 240, 242 on the bearing system of electric machine 208.

Figure 4:
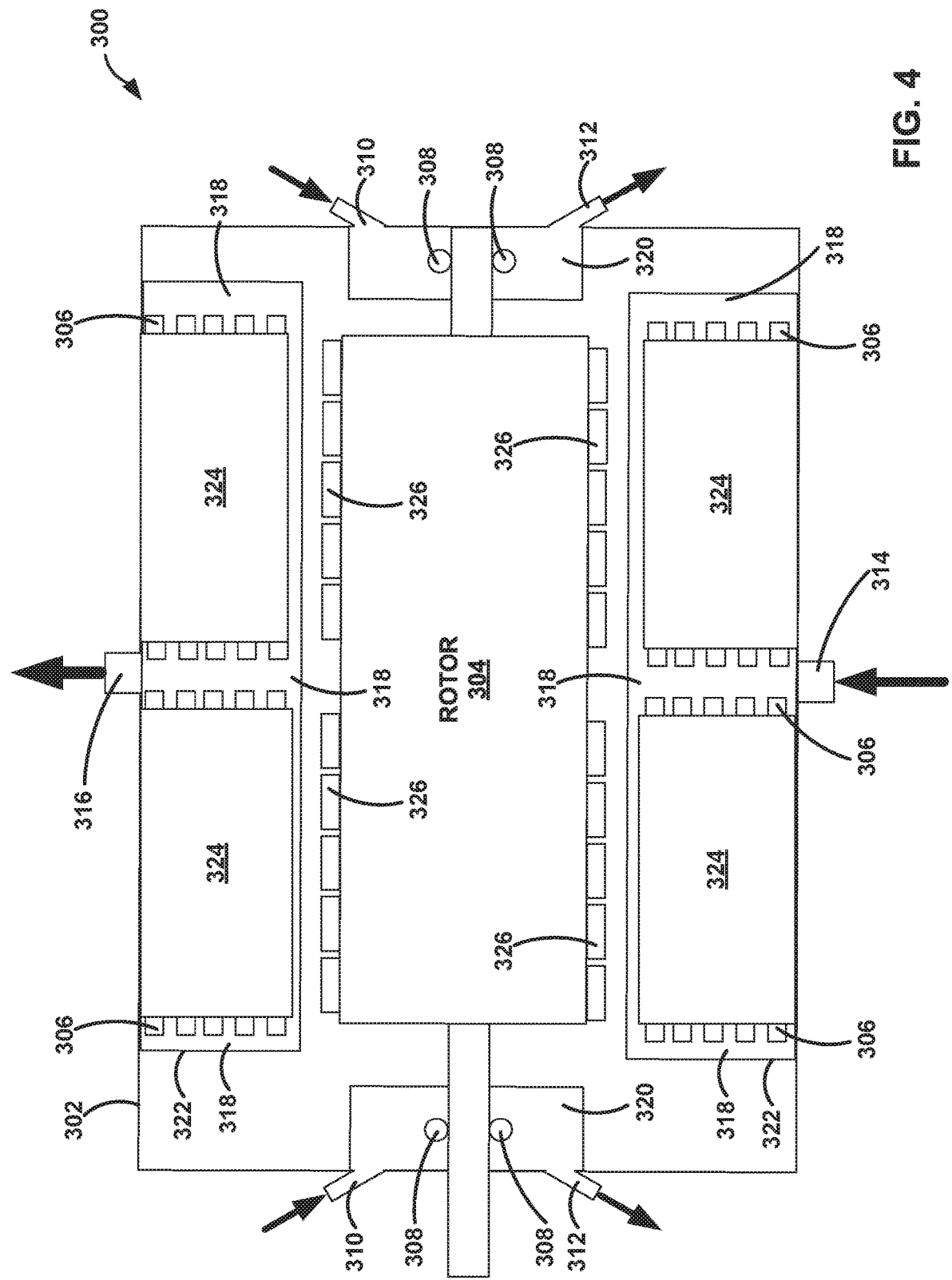
FIG. 4 is a cross-sectional view of an example generator, in accordance with one or more techniques of this disclosure.

FIG. 4 is a cross-sectional view of an example electric machine 300, in accordance with one or more techniques of this disclosure. In the example shown, electric machine 300 includes housing 302, rotor 304, stator windings 306, and bearings 308.

Housing 302 may be configured to provide structure for the components of electric machine 300 and may be made of metal and/or any suitable material. Housing 302 may include bearings inlets 310, bearings outlets 312, stator inlet 314, and stator outlet 316. Each of the inlets and outlets 310-316 may be configured to receive and/or output a fluid, e.g., a cooling oil, into and/or from bearings volumes 320 and stator volumes 318.

In some examples, bearings inlets 310 may be fluidically connected to a pump via a fluid path, e.g., pump 212 via tubes and/or pipes. A fluid may flow through bearings inlets 310 and fill bearings volumes 320. Bearing volumes 320 may at least partially include bearings 308, which may be mechanically connected to rotor 304 and via a drive shaft (not shown). Bearings 308 may be configured to reduce friction and/or rotational resistance of the shaft and/or rotor 304. In some examples, bearings 308 may still have some friction heating bearings 308. The fluid flowing in and through bearings volumes 320 may be in communication with bearings 308, and bearings 308 may transfer at least a portion of its heat to the fluid. In some examples, the fluid may be configured to reduce a friction and/or rotational resistance of bearings 308. The fluid may flow from bearings volumes 320 through bearings outlets 312 and to a heat exchanger via a fluid path, e.g., heat exchanger 210 via tubes and/or pipes. In some examples, the fluid may be extracted from bearings volumes 320 by pump 212 via additional pump elements 240/242. In some examples, the fluid drains from bearings volumes 320 to engine 204, an external sump (not shown), or another lubrication system component (not shown) before delivery of the fluid to heat exchanger 210 via pump 212.

In some examples, stator inlet 314 may be fluidically connected to a pump via a fluid path, e.g., pump 212 via tubes and/or pipes. In some examples, stator inlet 314 may be fluidically connected to the same pump as bearings inlets 310. A fluid may flow through stator inlet 314 and fill stator volumes 318. Stator volumes 318 may at least partially include stator windings 306. In the example shown, stator windings 306 are wound about stator teeth 324. Stator windings 306 may be configured to conduct direct and/or alternating currents and may generate heat, for example, due to winding resistance. In some examples, electric machine 300 may be configured to minimize losses in the rotor such that the majority of heat generated by electric machine 300 occurs in the stator, e.g., in the stator windings. For example, rotor 304 may include permanent magnets 326 as opposed to electromagnets that include conductors, and rotor 304 may use magnetic and/or conductive materials and that reduce, prevent, and/or minimize induced currents in rotor 304 and/or rotor components. Additionally or alternatively, stator windings 306 may be distributed windings. In some examples, stator windings 306 may be configured to reduce and/or eliminate the need for spray cooling or flooded cooling within the shaft and/or the rotor via concentrating losses to the stationary part of electric machine 208.

In some examples, the fluid flowing in and through stator volumes 318 may be in communication with stator windings 306, and stator windings 306 may transfer at least a portion of its heat to the fluid. The fluid may flow from stator volumes 318 through bearings outlets 312 and to a heat exchanger via a fluid path, e.g., heat exchanger 210 via tubes and/or pipes. In some examples, electric machine 300 may include a stator tube 322 configured to prevent the fluid from contacting rotor 304 and/or volume of space within which rotor 304 operates. For example, stator 322 tube may be attached to housing 302 and/or a stator within which stator windings 306 are located. Stator tube 322 may be made of any suitable material, e.g., steel, copper, aluminum, plastics, polymeric materials, and the like. In some examples, stator 322 tube may be configured to keep rotor 304 dry, e.g., prevent and/or reduce moisture and/or humidity buildup.

In some examples, rotor 304 may generate some heat, e.g., via friction due to air resistance, stresses within the materials and/or components of rotor 304, and the like. Rotor 304 may transfer some of its heat across an air gap between rotor 304 and the stator and/or stator tube 322, e.g., via convection and radiation. Rotor 304 may also transfer some of its heat via conduction through bearings 308. In some examples, rotor 304 may transfer at least a portion of its heat to the fluid via convection, radiation, and conduction through bearings 308.

In some examples, electric machine 300 may be configured to receive and/or output the fluid from a cooling circuit that may be integral to the cooling circuit of a prime mover that drives electric machine 300, such as a gas turbine engine. In some examples, the overall system weight and complexity may be reduced via a common cooling system and fluid between electric machine 300 and the prime mover, e.g., at least via a reduction in the total number of fluid loops and fluid types.

Figure 5:
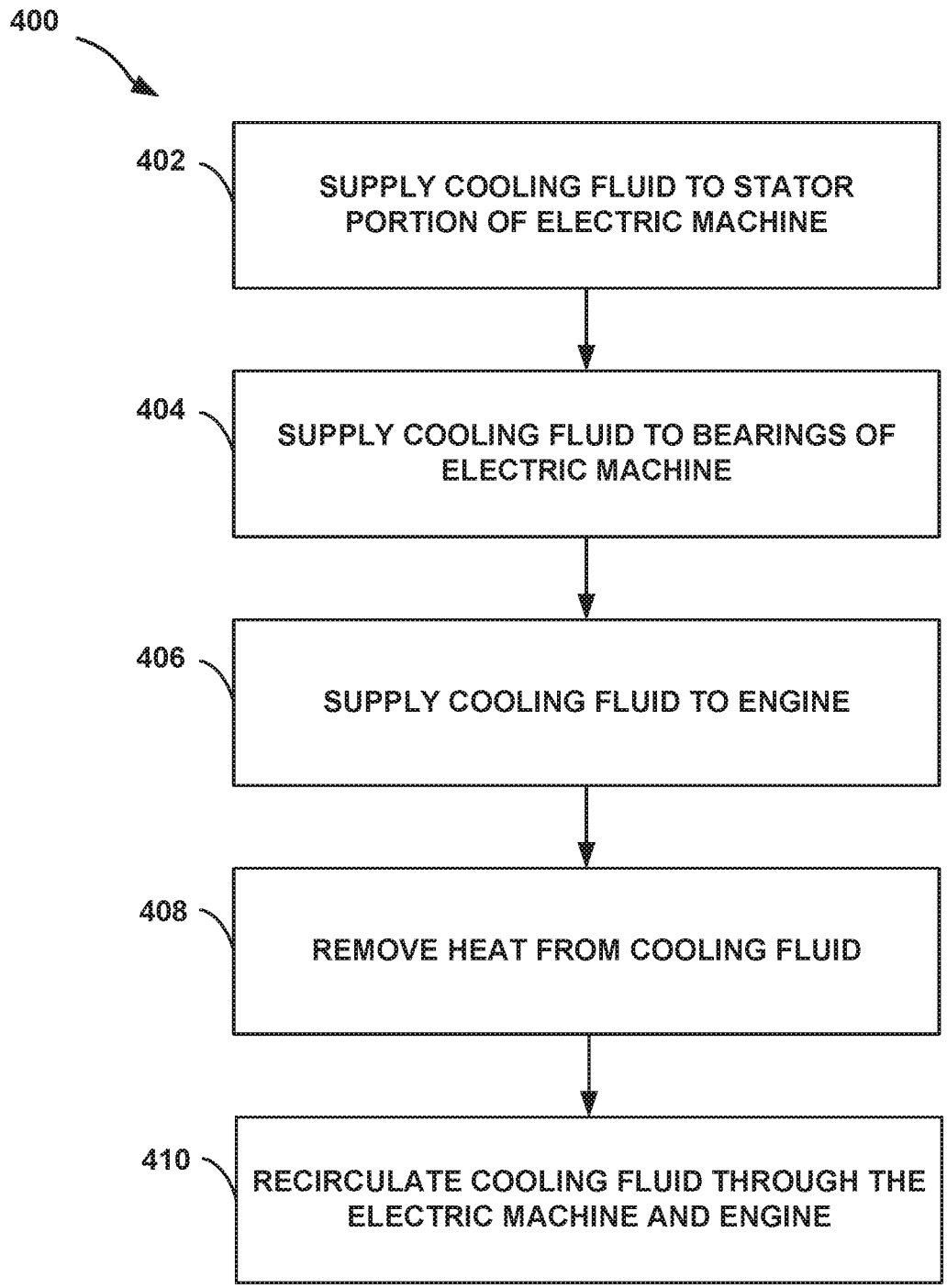
FIG. 5 is a flowchart of an example method of generator cooling, in accordance with one or more techniques of this disclosure.

FIG. 5 is a flowchart of an example method of cooling an electric machine, in accordance with one or more techniques of this disclosure.

A cooling fluid may be supplied to a stator portion of an electric machine (402). For example, a pump may move a cooling fluid from a fluid tank to flood and flow through a stator winding volume in an electric machine. For example, pump 212 may move a cooling fluid from fluid tank 222 via pipes, tubes, and/or conduits to electric machine 300 and through stator inlet 314, thereby flooding stator volumes 318. The cooling oil may come into fluid communication with stator windings 306 and absorb heat from stator windings 306 via conduction. Pump 212 may cause the heated cooling oil to flow out through stator outlet 316. In some examples, stator tube 322 included in electric machine 300 may contain the cooling fluid to within the stator volumes 318, e.g., the stator portions, and prevent the cooling fluid from contacting rotor 304. Stator tube 322 may be configured to keep fluids, e.g., the cooling fluid, and/or any other fluid such as moisture vapor and/or humidity, from entering a volume of space including rotor 304. In other words, stator tube 216, 322 may keep rotor 218, 304 substantially dry.

The cooling fluid may be supplied to bearings of the electric machine (404). For example, the pump may move fluid from a fluid tank to lubricate bearings 308 in bearings volume 320. For example, pump 212 may move a cooling fluid from fluid tank 222 via pipes, tubes, and/or conduits to electric machine 300 and through bearings inlets 310, thereby -lubricate bearings volumes 320. The cooling oil may come into fluid communication with bearings 308 and absorb heat from bearings 308 via conduction. The cooling oil may also lubricate bearings 308. Pump 212 may cause the heated cooling oil to flow out through bearings outlets 312. In some examples, pump 212 may move the same fluid, e.g., cooling fluid, through bearings inlets 310 to cool and lubricate bearings 308 as the fluid pump 212 moves through stator inlet 314 to cool stator windings 306.

The cooling fluid may be supplied to an engine mechanically connected to the electric machine via a shaft (406). For example, the pump may move the cooling fluid from a fluid tank to flow through the engine to cool the engine. For example, pump 212 may move a cooling fluid from fluid tank 222 via pipes, tubes, and/or conduits to engine 206. The cooling oil may come into fluid communication with engine 206 and/or components of engine 206 and absorb heat from engine 206 via conduction. In some examples, pump 212 may move the same cooling fluid, e.g., cooling fluid, through engine 204 to cool engine 204 as the cooling fluid that pump 212 moves through bearings inlets 310 and stator inlet 314 to cool and lubricate bearings 308 and to cool stator windings 306.

In some examples, supplying a cooling fluid to a stator portion of an electric machine (402), supplying the cooling fluid to bearings of the electric machine (404), and supplying the cooling fluid to an engine mechanically connected to the electric machine via a shaft (406) may be performed in series and in any order, e.g., in any sequential order. In some examples, supplying a cooling fluid to a stator portion of an electric machine (402), supplying the cooling fluid to bearings of the electric machine (404), and supplying the cooling fluid to an engine mechanically connected to the electric machine via a shaft (406) may be performed in parallel, e.g., at substantially the same time.

Heat may be removed from the cooling fluid (408). For example, the pump may move a cooling fluid from an electric machine and/or an engine to flow through a heat exchanger and the heat exchanger may cool the cooling fluid via removing heat from the fluid. For example, pump 212 may move the cooling fluid through a cooling circuit including fluid tank 222, pump 212, electric machine 212, 300, engine 204, and heat exchanger 210. Pump 212 may move the cooling oil and/or water through stator outlet 316, bearings outlets 312, and from engine 204 to heat exchanger 210. Heat exchanger 210 may remove heat from the cooling fluid.

The cooling fluid may be recirculated through the electric machine, and optionally the engine (410). For example, the pump may recirculate the cooling fluid through the cooling circuit including the cooling system, electric machine, and engine. For example, pump 212 may move the cooling fluid from heat exchanger 210 to fluid tank 222 to be drawn from to circulate through and cool electric machine 212, 300 and engine 204.

The following examples may illustrate one or more aspects of the disclosure:

Example 1. A system comprising: an electric machine including a stator comprising one or more windings and a rotor comprising a plurality of permanent magnets configured to reduce induced currents in the rotor and cause a majority of heat generated by the electric machine via energy conversion losses to be localized to the windings of the stator; a proximal bearing housed within a proximal bearing volume disposed along a proximal half of the rotor; a proximal bearing volume fluid inlet and a proximal bearing volume fluid outlet; a distal bearing housed within a distal bearing volume separate from the proximal bearing volume and disposed along a distal half of the rotor; a distal bearing volume fluid inlet and a distal bearing volume fluid outlet; a cooling system configured to supply, from a cooling fluid tank, a cooling fluid to cool the electric machine; and a stator tube configured to contain the cooling fluid within a stator portion of the electric machine and prevent the cooling fluid from contacting the rotor the stator tube including a stator fluid inlet and a stator fluid outlet; an engine; and a chip detector fluidically coupled to the proximal bearing volume fluid outlet and the distal bearing volume fluid outlet and configured to receive the cooling fluid from the proximal bearing volume and the distal bearing volume; wherein the cooling system comprises a cooling circuit that includes both the engine and the electric machine, and wherein the cooling system is configured to supply the cooling fluid to the engine to cool the engine, wherein the cooling system is configured to supply, from the cooling fluid tank, the cooling fluid to: the proximal bearing volume via the proximal bearing volume fluid inlet, to the distal bearing volume via the distal bearing volume fluid inlet, and to the stator tube via the stator fluid inlet, wherein the cooling fluid is configured to cool and lubricate the proximal and distal bearings, wherein the rotor is configured to transfer heat through the proximal and distal bearings to the cooling fluid, wherein cooling fluid exiting the stator fluid outlet does not flow through the chip detector before returning to the cooling fluid tank.

Example 2. The system of claim 1, further comprising an engine, wherein the cooling system comprises a cooling circuit that includes both the engine and the electric machine, and wherein the cooling system is configured to supply the cooling fluid to the engine to cool the engine.

Example 3. The system of claim 2, wherein the electric machine comprises a generator, wherein the rotor of the generator coupled to an output shaft of the engine and is configured to be driven by the engine.

Example 4. The system of claim 3, wherein the engine comprises a gas turbine engine.

Example 5. The system of claim 1, wherein the electric machine further comprises one or more bearings, and wherein the cooling system is configured to supply the cooling fluid to the one or more bearings.

Example 6. The system of claim 5, wherein the cooling fluid is configured to cool and lubricate the one or more bearings.

Example 7. The system of claim 2, wherein the cooling system comprises: a cooling fluid tank configured to store the cooling fluid; a pump in fluid communication with the fluid tank and configured to move fluid within the cooling circuit to the engine and the electric machine; and a heat exchanger configured to receive the cooling fluid from any of the electric machine, the engine, and the pump, wherein the heat exchanger is configured to remove heat from the cooling fluid.

Example 8. The system of claim 1, wherein the cooling fluid comprises oil or water.

Example 9. The system of claim 2, wherein the cooling circuit is configured to supply the same cooling fluid to the engine and the electric machine.

Example 10. A method of cooling an electric machine, the method comprising: supplying, by a cooling system, a cooling fluid to flood a stator portion of the electric machine with the cooling fluid, wherein the electric machine comprises a stator tube configured to contain the cooling fluid within a stator portion of the electric machine and prevent the cooling fluid from contacting the rotor of the electric machine, wherein the stator portion comprises one or more windings, wherein the rotor comprises a plurality of permanent magnets configured to reduce induced currents in the rotor and cause a majority of heat generated by the electric machine via energy conversion losses to be localized to the windings of the stator; supplying, by the cooling system and via a proximal bearing volume inlet, the cooling fluid to a proximal bearing volume comprising a proximal bearing disposed along a proximal half of the rotor and in contact with a portion of the rotor; supplying, by the cooling system and via a distal bearing volume inlet, the cooling fluid to a distal bearing volume comprising a distal bearing disposed along a distal half of the rotor and in contact with a portion of the rotor; receiving, by a chip detector, the cooling fluid from at least one of the proximal bearing volume or the distal bearing volume; and analyzing, by the chip detector, the cooling fluid for chips, wherein the cooling fluid exiting the stator portion is not received by the chip detector before returning to a cooling fluid tank configured to store the cooling fluid.

Example 11. The method of claim 10, further comprising: supplying, by the cooling system, the cooling fluid to one or more bearings of the electric machine.

Example 12. The method of claim 11, wherein the cooling fluid is configured to both cool and lubricate the one or more bearings.

Example 13. The method of claim 10, further comprising: supplying, by the cooling system, the cooling fluid to an engine mechanically connected to the electric machine via a shaft.

Example 14. The method of claim 10, wherein the fluid comprises an oil or water.

Example 15. A system comprising: an electric machine comprising a stator comprising one or more windings; a stator tube comprising a stator fluid inlet and a stator fluid outlet; a rotor comprising a plurality of permanent magnets configured to reduce induced currents in the rotor and cause a majority of heat generated by the electric machine via energy conversion losses to be localized to the windings of the stator; a proximal bearing housed within a proximal bearing volume disposed along a proximal half of the rotor; a proximal bearing volume fluid inlet and a proximal bearing volume fluid outlet; a distal bearing housed within a distal bearing volume separate from the proximal bearing volume and disposed along a distal half of the rotor; a distal bearing volume fluid inlet and a distal bearing volume fluid outlet; a gas turbine engine comprising a shaft coupled to the rotor of the electric machine; a cooling system comprising: a cooling circuit configured to supply cooling fluid from a cooling fluid tank configured to store the cooling fluid, to the gas turbine engine, the stator tube via the stator tube inlet, the proximal bearing volume via the proximal bearing volume fluid inlet, and the distal bearing volume via the distal bearing volume fluid inlet, wherein the stator tube is configured to contain the cooling fluid within a stator portion of the electric machine and prevent the cooling fluid from contacting the rotor; and a chip detector fluidically coupled to the proximal bearing volume fluid outlet and distal bearing volume fluid outlet and configured to receive the cooling fluid from the proximal bearing volume and the distal bearing volume, wherein cooling fluid exiting the stator fluid outlet does not flow through the chip detector before returning to the cooling fluid tank.

Example 16. The system of claim 15, wherein the cooling fluid comprises an oil or water.

Example 17. The system of claim 15, wherein the electric machine is configured such that a majority of heat generated by the electric machine via energy conversion losses is localized to one or more stator windings.

Example 18. The system of claim 15, wherein the cooling circuit is configured to supply the same cooling fluid to the engine and the electric machine.

Example 19. The system of claim 15, wherein the cooling system further comprises: a cooling fluid tank configured to store the cooling fluid; a pump in fluid communication with the fluid tank and configured to move fluid within the cooling circuit to the gas turbine engine and the electric machine; and a heat exchanger configured to receive the cooling fluid from any of the electric machine, the engine, and the pump, wherein the heat exchanger is configured to remove heat from the cooling fluid.

Example 20. The system of claim 15, wherein the rotor of the electric machine coupled to an output shaft of the engine is configured to be driven by the engine.

Various examples have been described. These and other examples are within the scope of the following claims.

What is claimed is:

1. A system comprising:
    an electric machine including:
        a stator comprising one or more windings;
        a rotor comprising a plurality of permanent magnets configured to reduce induced currents in the rotor and cause a majority of heat generated by the electric machine via energy conversion losses to be localized to the windings of the stator;
        a proximal bearing housed within a proximal bearing volume disposed along a proximal half of the rotor;
        a proximal bearing volume fluid inlet and a proximal bearing volume fluid outlet;
        a distal bearing housed within a distal bearing volume separate from the proximal bearing volume and disposed along a distal half of the rotor;
        a distal bearing volume fluid inlet and a distal bearing volume fluid outlet;
    a cooling system configured to supply, from a cooling fluid tank, a cooling fluid to cool the electric machine;
    a stator tube configured to contain the cooling fluid within a stator portion of the electric machine and prevent the cooling fluid from contacting the rotor, the stator tube including a stator fluid inlet and a stator fluid outlet;
    an engine; and
    a chip detector fluidically coupled to the proximal bearing volume fluid outlet and the distal bearing volume fluid outlet and configured to receive the cooling fluid from the proximal bearing volume and the distal bearing volume, wherein cooling fluid exiting the stator fluid outlet does not flow through the chip detector before returning to the cooling fluid tank;
    wherein the cooling system comprises a cooling circuit that includes both the engine and the electric machine, and wherein the cooling system is configured to supply the cooling fluid to the engine to cool the engine,
    wherein the cooling system is configured to supply, from the cooling fluid tank, the cooling fluid to:
        the proximal bearing volume via the proximal bearing volume fluid inlet,
        to the distal bearing volume via the distal bearing volume fluid inlet, and
        to the stator tube via the stator fluid inlet,
    wherein the cooling fluid is configured to cool and lubricate the proximal and distal bearings, wherein the rotor is configured to transfer heat through the proximal and distal bearings to the cooling fluid.

2. The system of claim 1, wherein the electric machine comprises a generator, wherein the rotor of the generator is coupled to an output shaft of the engine and is configured to be driven by the engine.

3. The system of claim 2, wherein the engine comprises a gas turbine engine.

4. The system of claim 1, wherein the cooling fluid is configured to cool and lubricate the proximal bearing or the distal bearing.

5. The system of claim 1, wherein the cooling system comprises:
    a pump in fluid communication with the fluid tank and configured to move fluid within the cooling circuit to the engine and the electric machine; and
    a heat exchanger configured to receive the cooling fluid from any of the electric machine, the engine, and the pump, wherein the heat exchanger is configured to remove heat from the cooling fluid,
    wherein the cooling fluid tank is configured to store the cooling fluid.

6. The system of claim 1, wherein the cooling fluid comprises oil or water.

7. The system of claim 1, wherein the cooling circuit is configured to supply the same cooling fluid to the engine and the electric machine.

8. A method of cooling an electric machine, the method comprising:
    supplying, by a cooling system, a cooling fluid to flood a stator portion of the electric machine with the cooling fluid, wherein the electric machine comprises a stator tube configured to contain the cooling fluid within the stator portion of the electric machine and prevent the cooling fluid from contacting a rotor of the electric machine, wherein the stator portion comprises one or more windings, wherein the rotor comprises a plurality of permanent magnets configured to reduce induced currents in the rotor and cause a majority of heat generated by the electric machine via energy conversion losses to be localized to the windings of the stator portion;
    supplying, by the cooling system and via a proximal bearing volume inlet, the cooling fluid to a proximal bearing volume comprising a proximal bearing disposed along a proximal half of the rotor and in contact with a portion of the rotor;
    supplying, by the cooling system and via a distal bearing volume inlet, the cooling fluid to a distal bearing volume comprising a distal bearing disposed along a distal half of the rotor and in contact with a portion of the rotor;
    receiving, by a chip detector, the cooling fluid from at least one of the proximal bearing volume or the distal bearing volume, wherein the cooling fluid exiting the stator portion is not received by the chip detector before returning to a cooling fluid tank configured to store the cooling fluid; and
    analyzing, by the chip detector, the cooling fluid for chips.

9. The method of claim 8, wherein the cooling fluid is configured to both cool and lubricate the proximal bearing and the distal bearing.

10. The method of claim 8, further comprising:
    supplying, by the cooling system, the cooling fluid to an engine mechanically connected to the electric machine via a shaft.

11. The method of claim 8, wherein the cooling fluid comprises an oil or water.

12. A system comprising:
an electric machine comprising:
- a stator comprising one or more windings;
- a stator tube comprising a stator fluid inlet and a stator fluid outlet;
- a rotor comprising a plurality of permanent magnets configured to reduce induced currents in the rotor and cause a majority of heat generated by the electric machine via energy conversion losses to be localized to the windings of the stator;
- a proximal bearing housed within a proximal bearing volume disposed along a proximal half of the rotor;
- a proximal bearing volume fluid inlet and a proximal bearing volume fluid outlet;
- a distal bearing housed within a distal bearing volume separate from the proximal bearing volume and disposed along a distal half of the rotor;
- a distal bearing volume fluid inlet and a distal bearing volume fluid outlet;

a gas turbine engine comprising a shaft coupled to the rotor of the electric machine;
a cooling system comprising:
- a cooling circuit configured to supply cooling fluid, from a cooling fluid tank configured to store the cooling fluid, to the gas turbine engine, the stator tube via the stator fluid inlet, the proximal bearing volume via the proximal bearing volume fluid inlet, and the distal bearing volume via the distal bearing volume fluid inlet, wherein the stator tube is configured to contain the cooling fluid within a stator portion of the electric machine and prevent the cooling fluid from contacting the rotor; and
- a chip detector fluidically coupled to the proximal bearing volume fluid outlet and distal bearing volume fluid outlet and configured to receive the cooling fluid from the proximal bearing volume and the distal bearing volume, wherein cooling fluid exiting the stator fluid outlet does not flow through the chip detector before returning to the cooling fluid tank.

13. The system of claim 12, wherein the cooling fluid comprises an oil or water.

14. The system of claim 12, wherein the cooling circuit is configured to supply the same cooling fluid to the gas turbine engine and the electric machine.

15. The system of claim 12, wherein the cooling system further comprises:
- a pump in fluid communication with the cooling fluid tank and configured to move fluid within the cooling circuit to the gas turbine engine and the electric machine; and
- a heat exchanger configured to receive the cooling fluid from any of the electric machine, the gas turbine engine, and the pump, wherein the heat exchanger is configured to remove heat from the cooling fluid.

16. The system of claim 12, wherein the rotor of the electric machine is coupled to an output shaft of the gas turbine engine and is configured to be driven by the gas turbine engine.

* * * * *